(12) United States Patent
Chen et al.

(10) Patent No.: US 11,785,558 B2
(45) Date of Patent: *Oct. 10, 2023

(54) POWER HEADROOM REPORT METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 232 days.

This patent is subject to a terminal disclaimer.

(21) Appl. No.: 17/328,923

(22) Filed: May 24, 2021

(65) Prior Publication Data

US 2021/0282095 A1 Sep. 9, 2021

Related U.S. Application Data

(63) Continuation of application No. 16/896,578, filed on Jun. 9, 2020, now Pat. No. 11,039,407, which is a
(Continued)

(51) Int. Cl.
*H04W 52/36* (2009.01)
*H04W 76/27* (2018.01)
(Continued)

(52) U.S. Cl.
CPC ......... *H04W 52/365* (2013.01); *H04L 5/0092* (2013.01); *H04W 52/08* (2013.01);
(Continued)

(58) Field of Classification Search
None
See application file for complete search history.

(56) References Cited

U.S. PATENT DOCUMENTS

2014/0198765 A1 7/2014 Krishnamurthy et al.
2018/0262998 A1 9/2018 Park et al.
(Continued)

FOREIGN PATENT DOCUMENTS

CN 101895923 A 11/2010
CN 102123437 A 7/2011
(Continued)

OTHER PUBLICATIONS

EPO, Examination Report for European Application No. 18907174. 9. dated Aug. 3, 2021. 12 pages.
(Continued)

*Primary Examiner* — Christine T Duong
(74) *Attorney, Agent, or Firm* — PERKINS COIE LLP (57) ABSTRACT

Disclosed are a power headroom (PH) report method and apparatus, and a computer storage medium. The method includes: a network device receives, from a terminal, power headroom (PH) of an uplink signal in at least one bandwidth part (BWP) among a plurality of BWPs after the terminal calculates PH of uplink signals in the plurality of BWPs, wherein the plurality of BWPs include at least one active uplink BWP for the terminal.

14 Claims, 2 Drawing Sheets

Related U.S. Application Data continuation of application No. PCT/CN2018/077041, filed on Feb. 23, 2018.

(51) Int. Cl.

| | | |
|---|---|---|
| *H04L 5/00* | (2006.01) | |
| *H04W 52/08* | (2009.01) | |
| *H04W 52/42* | (2009.01) | |
| *H04W 74/08* | (2009.01) | |
| *H04W 80/02* | (2009.01) | |
| *H04W 72/23* | (2023.01) | |

(52) U.S. Cl.
CPC ......... *H04W 52/367* (2013.01); *H04W 52/42* (2013.01); *H04W 72/23* (2023.01); *H04W 74/0833* (2013.01); *H04W 76/27* (2018.02); *H04W 80/02* (2013.01)

(56) References Cited

U.S. PATENT DOCUMENTS

| | | | |
|---|---|---|---|
| 2019/0053170 A1 | 2/2019 | Lee et al. | |
| 2019/0174432 A1* | 6/2019 | Wang | .................... H04W 72/21 |
| 2020/0288412 A1 | 9/2020 | Ajdakple et al. | |
| 2020/0305148 A1* | 9/2020 | Niu | ..................... H04W 52/365 |

FOREIGN PATENT DOCUMENTS

| | | |
|---|---|---|
| CN | 102291731 A | 12/2011 |
| CN | 102740346 A | 10/2012 |
| CN | 103974319 A | 8/2014 |
| CN | 107690157 A | 2/2018 |
| WO | 2014175634 A1 | 10/2014 |
| WO | 2016045130 A1 | 3/2016 |

OTHER PUBLICATIONS

JPO, Notice of Reasons for Refusal for Japanese Application No. 2020-544437. dated Sep. 17, 2021. 9 pages with English translation.
VIVO "Remaining issues on NR UL power control" R1-1717508; 3GPP TSG RAN WG1 Meeting #90bis; Oct. 9-13, 2017. 7 pages.
Examination Report for Indian Application No. 202017036313 dated Nov. 18, 2021. 5 pages with English translation.
Notification of Reason for Refusal for Korean Application No. 10-2020-7025348 dated Dec. 28, 2021. 12 pages with English translation.
Decision of Refusal of the Japanese application No. 2020-544437, dated May 13, 2022. 7 pages with English Translation.
Ericsson "Power headroom report in NR" Tdoc R2-1708199; 3GPP TSG RAN WG2 #99; Berlin, Germany; Aug. 21-25, 2017. 6 pages.
First Office Action for Chinese Application No. 202010423291.0 dated Nov. 18, 2022. 11 pages with English translation.
3GPP TSG RAN WG1 Meeting #92, Athens, Greece, Feb. 26-Mar. 2, 2018—R1-1801462—Huawei, HiSilicon, Remaining details of UL power control design (14 pages).
Examination Report No. 1 for Australian Patent Application No. 2018409912. dated Mar. 1, 2021.
Extended European Search Report for European Patent Application No. 18907174.9. dated Dec. 21, 2020.
Final Office Action dated Nov. 30, 2020 of U.S. Appl. No. 16/896,578, filed Jun. 9, 2020.
Huawei et al., "Designs on power headroom calculation and reporting", 3rd Generation Partnership Project (3GPP), URL: http://www.3gpp.org/ftp/tsg%5Fran/WG1%5FRL1/TSGR1%5F91/Docs/, (Nov. 17, 2017).
International Search Report dated Nov. 1, 2018 of PCT/CN2018/077041 (4 pages).
LG Electronics Inc, "PHR for wider bandwidth operation", 3rd Generation Partnership Project (3GPP), URL: http://www.3gpp.org/ftp/Meetings_3GPP_SYNC/RAN2/Docs/, (Oct. 8, 2017).
Non-Final Office Action dated Aug. 25, 2020 of U.S. Appl. No. 16/896,578, filed Jun. 9, 2020.
Notice of Allowance dated Feb. 10, 2021 of U.S. Appl. No. 16/896,578, filed Jun. 9, 2020.
VIVO, "Remaining issues on NR UL power control", 3rd Generation Partnership Project (3GPP), URL: http://www.3gpp.org/ftp/tsg%5Fran/WG1%5FRL1/TSGR1%5F92/Docs/, (Feb. 15, 2018).
Supplemental Notice of Allowability dated Mar. 25, 2021 of U.S. Appl. No. 16/896,578, filed Jun. 9, 2020.

* cited by examiner

POWER HEADROOM REPORT METHOD AND APPARATUS, AND COMPUTER STORAGE MEDIUM

CROSS-REFERENCE TO RELATED APPLICATIONS

This application is a continuation application of U.S. patent application Ser. No. 16/896,578, filed on Jun. 9, 2020, which is a continuation application of International Application No. PCT/CN2018/077041 filed on Feb. 23, 2018. The entire disclosure of the above-identified applications is hereby incorporated by reference.

TECHNICAL FIELD

The present disclosure relates to the technical field of wireless communication, in particular to a power headroom report method and apparatus, and a computer storage medium.

BACKGROUND

Power Headroom (PH) of a Physical Uplink Shared Channel (PUSCH) refers to a difference value between the maximum transmission power allowed by a terminal and currently calculated PUSCH transmission power, and can be simply expressed as the formula: PH_PUSCH= UEAllowedMaxTransPower−PuschPower, where PH_PUSCH represents the PUSCH power headroom, UEAllowedMaxTransPower represents the maximum transmission power allowed by the terminal, and PuschPower represents the currently calculated PUSCH transmission power. The PUSCH power headroom represents how much transmission power the terminal can use in addition to the transmission power currently used for PUSCH transmission, where PuschPower is not an actual sending power of the terminal, but the sending power calculated according to a certain formula. The unit of PH_PUSCH is dB. If the PH_PUSCH is negative, it indicates that the sending power calculated by the terminal exceeds the maximum sending power allowed by the terminal.

In the New Radio (NR), a terminal needs to perform a power headroom report (PHR) for a PUSCH and a sounding reference signal (SRS) respectively. The terminal not only needs to perform a PH report for a carrier that currently transmits the PUSCH or SRS, but also needs to perform a PH report for a carrier that does not transmit the PUSCH or SRS so as to provide a reference for a network side to perform scheduling on the carrier.

In addition, in the NR, one carrier may include up to four bandwidth parts (BWPs), and the network side may dynamically activate a part of the BWPs for data or reference signal transmission. Different BWPs can be allocated with different bandwidths and be used for data transmission of different service types. For example, one BWP can be used for data transmission of enhance mobile broadband (eMBB), and another BWP can be used for data transmission of ultra reliable low latency communication (URLLC). At present, there is only one PHR per carrier, and the network side cannot obtain the specific power headroom information on each BWP in a carrier, and thus cannot reasonably schedule uplink signal transmission on each BWP. Moreover, since PUSCH transmission can be dynamically switched among multiple BWPs, the network side needs to have real-time power headroom information on multiple BWPs simultaneously for performing reasonable BWP switching.

SUMMARY

In order to solve the above technical problems, implementations of the present disclosure provide a power headroom report method and apparatus, and a computer storage medium.

An implementation of the present disclosure provides a power headroom report method, which includes: calculating, by a terminal, PH of uplink signals on multiple BWPs, wherein the multiple BWPs are BWPs currently configured or activated for the terminal; and sending, by the terminal, the PH of the uplink signal on at least one BWP among the multiple BWPs to a network device.

In one implementation of the present disclosure, the method further includes: receiving, by the terminal, the multiple BWPs indicated by the network device through radio resource control (RRC) signaling, system information (SI), media access control (MAC) signaling, or downlink control information (DCI) signaling.

In one implementation of the present disclosure, the multiple BWPs are BWPs configured or activated by the network device for the terminal on one carrier.

In one implementation of the present disclosure, calculating, by the terminal, the power headroom (PH) of the uplink signals on the multiple bandwidth parts (BWPs) includes: calculating, by the terminal, PH of an uplink signal on each BWP among the multiple BWPs according to a transmission parameter and/or a power control parameter of the uplink signal on the each BWP among the multiple BWPs.

In one implementation of the present disclosure, the transmission parameter of the uplink signal includes at least one of the following: transmission bandwidth of the uplink signal, a modulation and coding scheme of the uplink signal, and subcarrier spacing of the uplink signal.

In one implementation of the present disclosure, the power control parameter of the uplink signal includes at least one of the following: maximum sending power, target reception power, a path loss factor, a path loss estimation value, and a closed loop power adjustment factor.

In one implementation of the present disclosure, the transmission parameter and/or the power control parameter of the uplink signal are respectively configured by the network device for each BWP among the multiple BWPs.

In one implementation of the present disclosure, for each BWP among the multiple BWPs: the transmission parameter and/or the power control parameter of the uplink signal on the BWP is a transmission parameter and/or a power control parameter of an uplink signal that is sent on the BWP at a moment when PH is calculated; or the transmission parameter and/or the power control parameter of the uplink signal on the BWP is a transmission parameter and/or a power control parameter of an uplink signal that is sent most recently on the BWP before PH is calculated.

In one implementation of the present disclosure, if the terminal sends an uplink signal on a first BWP among the multiple BWPs at a moment when PH is calculated, calculating, by the terminal, the PH of the uplink signal on each BWP among the multiple BWPs according to the transmission parameter and/or the power control parameter of the uplink signal on the each BWP among the multiple BWPs includes: calculating, by the terminal, the PH of the uplink signal on the first BWP according to the transmission parameter and the power control parameter of the uplink signal on the first BWP.

In one implementation of the present disclosure, if the terminal does not send an uplink signal on a first BWP among the multiple BWPs at a moment when PH is calculated, calculating, by the terminal, the PH of the uplink signal on each BWP among the multiple BWPs according to the transmission parameter and/or the power control parameter of the uplink signal on the each BWP among the multiple BWPs includes: calculating, by the terminal, the PH of the uplink signal on the first BWP according to the power control parameter of the uplink signal on the first BWP.

In one implementation of the present disclosure, if a time interval between a moment when an uplink signal is sent most recently on a second BWP among the multiple BWPs before PH is calculated and a moment when the PH is calculated is less than a first duration, calculating, by the terminal, the PH of the uplink signal on each BWP among the multiple BWPs according to the transmission parameter and/or the power control parameter of the uplink signal on the each BWP among the multiple BWPs includes: calculating, by the terminal, the PH of the uplink signal on the second BWP according to the transmission parameter and the power control parameter of the uplink signal on the second BWP.

In one implementation of the present disclosure, if a time interval between a moment when an uplink signal is sent most recently on a second BWP among the multiple BWPs before PH is calculated and a moment when the PH is calculated is greater than or equal to the first duration, calculating, by the terminal, the PH of the uplink signal on each BWP among the multiple BWPs according to the transmission parameter and/or the power control parameter of the uplink signal on the each BWP among the multiple BWPs includes: calculating, by the terminal, the PH of the uplink signal on the second BWP according to the power control parameter of the uplink signal on the second BWP.

In one implementation of the present disclosure, sending, by the terminal, the PH of the uplink signal on the at least one BWP among the multiple BWPs to the network device includes: sending, by the terminal, a BWP index of each BWP in the at least one BWP among the multiple BWPs and the PH corresponding to the BWP to the network device.

In one implementation of the present disclosure, sending, by the terminal, the PH of the uplink signal on the at least one BWP among the multiple BWPs to the network device includes: sending, by the terminal, the PH of the uplink signal on a BWP in an activated state among the multiple BWPs to the network device.

In one implementation of the present disclosure, sending, by the terminal, the PH of the uplink signal on the at least one BWP among the multiple BWPs to the network device includes: sending, by the terminal, the PH of the uplink signal on the at least one BWP corresponding to a maximum or minimum PH value among the multiple BWPs to the network device.

In one implementation of the present disclosure, the multiple BWPs belong to a first carrier, and the method further includes: calculating, by the terminal, PH of an uplink signal on the first carrier based on the PH of the uplink signal on the at least one BWP among the multiple BWPs on the first carrier; and sending, by the terminal, the PH of the uplink signal on the first carrier to the network device.

In one implementation of the present disclosure, calculating, by the terminal, the PH of the uplink signal on the first carrier based on the PH of the uplink signal on the at least one BWP among the multiple BWPs on the first carrier includes: calculating, by the terminal, the PH of the uplink signal on the first carrier based on PH of uplink signals on all the BWPs of the multiple BWPs on the first carrier; or calculating, by the terminal, the PH of the uplink signal on the first carrier based on PH of an uplink signal on a BWP in an activated state among the multiple BWPs on the first carrier.

In one implementation of the present disclosure, sending, by the terminal, the PH of the uplink signal on the at least one BWP among the multiple BWPs to the network device includes: sending, by the terminal, first PH of an uplink signal on a first BWP among the multiple BWPs and a difference value between the first PH and the PH of the uplink signal on the at least one BWP other than the first BWP among the multiple BWPs to the network device.

In one implementation of the present disclosure, the uplink signal is a signal on a PUSCH, an SRS, a signal on a physical uplink control channel (PUCCH), or a signal on a physical random access channel (PRACH).

An implementation of the present disclosure provides a power headroom report apparatus, which includes: a first calculation unit, configured to calculate power headroom (PH) of uplink signals on multiple BWPs, wherein the multiple BWPs are BWPs currently configured or activated for the terminal; and a first sending unit, configured to send the PH of the uplink signal on at least one BWP among the multiple BWPs to a network device.

In one implementation of the present disclosure, the apparatus further includes: a receiving unit, configured to receive the multiple BWPs indicated by the network device through RRC signaling, SI, MAC signaling, or DCI signaling.

In one implementation of the present disclosure, the multiple BWPs are BWPs configured or activated by the network device for the terminal on one carrier.

In one implementation of the present disclosure, the first calculation unit is configured to calculate PH of an uplink signal on each BWP among the multiple BWPs according to a transmission parameter and/or a power control parameter of the uplink signal on the each BWP among the multiple BWPs.

In one implementation of the present disclosure, the transmission parameter of the uplink signal includes at least one of the following: transmission bandwidth of the uplink signal, a modulation and coding scheme of the uplink signal, and subcarrier spacing of the uplink signal.

In one implementation of the present disclosure, the power control parameter of the uplink signal includes at least one of the following: maximum sending power, target reception power, a path loss factor, a path loss estimation value, and a closed loop power adjustment factor.

In one implementation of the present disclosure, the transmission parameter and/or the power control parameter of the uplink signal are respectively configured by the network device for each BWP among the multiple BWPs.

In one implementation of the present disclosure, for each BWP among the multiple BWPs: the transmission parameter and/or the power control parameter of the uplink signal on the BWP is a transmission parameter and/or a power control parameter of an uplink signal that is sent on the BWP at a moment when PH is calculated; or the transmission parameter and/or the power control parameter of the uplink signal on the BWP is a transmission parameter and/or a power control parameter of an uplink signal that is sent most recently on the BWP before PH is calculated.

In one implementation of the present disclosure, if the terminal sends an uplink signal on a first BWP among the multiple BWPs at a moment when PH is calculated, the first calculation unit is configured to calculate the PH of the uplink signal on the first BWP according to the transmission parameter and the power control parameter of the uplink signal on the first BWP.

In one implementation of the present disclosure, if the terminal does not send an uplink signal on a first BWP among the multiple BWPs at a moment when PH is calculated, the first calculation unit is configured to calculate the PH of the uplink signal on the first BWP according to the power control parameter of the uplink signal on the first BWP.

In one implementation of the present disclosure, if a time interval between a moment when an uplink signal is last most recently on a second BWP among the multiple BWPs before PH is calculated and a moment when the PH is calculated is less than a first duration, the first calculation unit is configured to calculate the PH of the uplink signal on the second BWP according to the transmission parameter and the power control parameter of the uplink signal on the second BWP.

In one implementation of the present disclosure, if a time interval between a moment when an uplink signal is sent most recently on a second BWP among the multiple BWPs before PH is calculated and a moment when the PH is calculated is greater than or equal to the first duration, the first calculation unit is configured to calculate the PH of the uplink signal on the second BWP according to the power control parameter of the uplink signal on the second BWP.

In one implementation of the present disclosure, the first sending unit is further configured to send a BWP index of each BWP in the at least one BWP among the multiple BWPs and the PH corresponding to the BWP to the network device.

In one implementation of the present disclosure, the first sending unit is configured to send the PH of the uplink signal on a BWP in an activated state among the multiple BWPs to the network device.

In one implementation of the present disclosure, the first sending unit is configured to send the PH of the uplink signal on the at least one BWP corresponding to a maximum or minimum PH value among the multiple BWPs to the network device.

In one implementation of the present disclosure, the multiple BWPs belong to a first carrier, and the apparatus further includes: a second calculation unit, configured to calculate PH of an uplink signal on the first carrier based on the PH of the uplink signal on the at least one BWP among the multiple BWPs on the first carrier; and a second sending unit, configured to send the PH of the uplink signal on the first carrier to the network device.

In one implementation of the present disclosure, the second calculation unit is configured to calculate the PH of the uplink signal on the first carrier based on PH of uplink signals on all the BWPs of the multiple BWPs on the first carrier; or calculate the PH of the uplink signal on the first carrier based on PH of an uplink signal on a BWP in an activated state among the multiple BWPs on the first carrier.

In one implementation of the present disclosure, the first sending unit is configured to send first PH of an uplink signal on a first BWP among the multiple BWPs and a difference value between the first PH and the PH of the uplink signal on the at least one BWP other than the first BWP among the multiple BWPs to the network device.

In one implementation of the present disclosure, the uplink signal is a signal on a PUSCH, an SRS, a signal on a PUCCH, or a signal on a PRACH.

An implementation of the present disclosure provides a computer storage medium, which includes computer-executable instructions stored thereon, wherein when the computer-executable instructions are executed by a processor, the above power headroom report method is implemented.

BRIEF DESCRIPTION OF DRAWINGS

The accompanying drawings described herein are provided for further understanding of the present disclosure, and constitute a part of this application, and exemplary implementations of the present disclosure and descriptions thereof are used for explaining the present disclosure, but do not constitute an improper limitation on the present disclosure. In the drawings.

DETAILED DESCRIPTION

In order to facilitate understanding of a technical solution of an implementation of the present disclosure, a PH calculation method related to the implementation of the present disclosure is described below.

1) If a terminal transmits a PUSCH on a particular carrier at a particular moment, a corresponding PH can be expressed as:

$$PH_{type1,f,c}(i,j,q_d,l)=P_{CMAX,f,c}(i)-\{P_{O\_PUSCH,f,c}(j)+10\log_{10}(2^\mu \cdot M_{RB,f,c}^{PUSCH}(i))+\alpha_{f,c}(j)\cdot PL_{f,c}(q_d)+f_{f,c}(i,l)\}$$

Herein, $P_{CMAX,f,c}(i)$ is the maximum sending power of the terminal, and the calculation result in the brace is an expected sending power calculated by the terminal according to actual PUSCH transmission parameters on the carrier at that moment.

2) If a terminal does not transmit a PUSCH on a particular carrier at a particular moment, a corresponding PH can be expressed as:

$$PH_{type1,f,c}(i,j,q_d,l)=\tilde{P}_{CMAX,f,c}(i)-\{P_{O\_PUSCH,f,c}(j)+\alpha_{f,c}(j)\cdot PL_{f,c}(q_d)+f_{f,c}(i,l)\}$$

Herein, $\tilde{P}_{CMAX,f,c}(i)$ is the maximum sending power presumed by the terminal on the carrier, and the calculation result in the brace is an expected sending power (no PUSCH transmission parameter) of the terminal on the carrier.

3) If a terminal transmits an SRS on a particular carrier at a particular moment, a corresponding PH can be expressed as:

$$PH_{type3,f,c}(i,q_s,l)=P_{CMAX,f,c}(i)-\{P_{O\_SRS,f,c}(q_s)+10\log_{10}(2^\mu \cdot M_{SRS,f,c}(i))+\alpha_{SRS,f,c}(q_s)\cdot PL_{f,c}(q_s)+h_{f,c}(i,l)\}$$

Herein, $P_{CMAX,f,c}(i)$ is the maximum sending power of the terminal, and the calculation result in the brace is an expected sending power calculated by the terminal according, to actual SRS transmission parameters on the carrier at that moment.

4) If a terminal does not transmit an SRS on a particular carrier at a particular moment, a corresponding PH can be expressed as:

$$PH_{type3,f,c}(i,q_s,l) = \tilde{P}_{CMAX,f,c}(i) - \{P_{O\_SRS,f,c}(q_{s0}) + \alpha_{SRS,f,c}(q_{s0}) \cdot PL_{f,c}(q_{s0}) + h_{f,c}(i,l)\}$$

Herein, $\tilde{P}_{CMAX,f,c}(i)$ is the maximum sending power presumed by the terminal on the carrier, and the calculation result in the brace is an expected sending power (no SRS transmission parameter) of the terminal on the carrier.

In a technical solution of an implementation of the present disclosure, a terminal calculates PH of uplink signals on multiple BWPs, wherein the multiple BWPs are BWPs currently configured or activated for the terminal, and the terminal sends the PH of the uplink signal on at least one BWP among the multiple BWPs to a network device. By adopting the technical solution of the implementation of the present disclosure, the terminal respectively reports power headroom for the currently configured or activated BWPs, so that the network side can perform resource scheduling and uplink power control on various BWPs flexibly.

Figure 1:
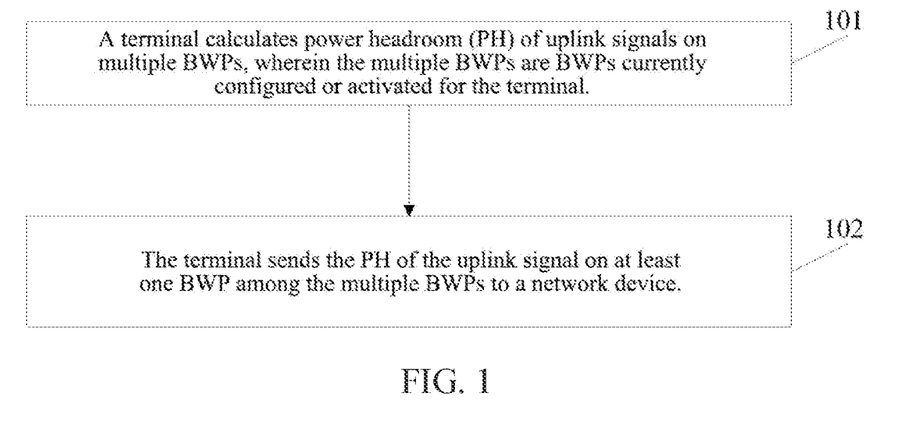
FIG. 1 is a schematic flowchart of a power headroom report method according to an implementation of the present disclosure.

Technical solutions in implementations of the present disclosure are hereinafter described in detail with reference to the accompanying drawings, FIG. 1 is a schematic flowchart of a power headroom report method according to an implementation of the present disclosure. As shown in FIG. 1, the power headroom report method includes acts 101 and 102.

In act 101, a terminal calculates power headroom (PH) of uplink signals on multiple BWPs, wherein the multiple BWPs are BWPs currently configured or activated for the terminal.

In an implementation of the present disclosure, the terminal is any device, such as a mobile phone, a tablet computer, a notebook computer or a desktop computer, capable of communicating with a network device.

In an implementation of the present disclosure, the terminal receives the multiple BWPs indicated by the network device through RRC signaling, SI, MAC signaling, or DCI signaling. Specifically, 1) The terminal receives a first message sent by the network device, wherein the first message is used for configuring N BWPs for the terminal, where N is an integer greater than 1.

Further, the first message is RRC signaling, or SI.

2) The terminal receives a second message sent by the network device, wherein the second message is used for indicating, to the terminal that BWPs to be activated are M BWPs out of the N BWPs, wherein M is a positive integer less than or equal to N.

Further, the second message is MAC signaling or DCI signaling.

3) The multiple BWPs are the N BWPs (that is, the multiple BWPs are BWPs currently configured for the terminal), or the multiple BWPs are the M BWPs (that is, the multiple BWPs are BWPs currently activated for the terminal).

In one implementation, the multiple BWPs are BWPs configured or activated by the network device for the terminal on one carrier.

In an implementation of the present disclosure, the terminal calculates PH of an uplink signal on each BWP among the multiple BWPs according to a transmission parameter and/or a power control parameter of the uplink signal on the each BWP among the multiple BWPs.

In one implementation, the transmission parameter of the uplink signal includes at least one of the following: transmission bandwidth of the uplink signal, a modulation and coding scheme of the uplink signal, and subcarrier spacing of the uplink signal.

In one implementation, the power control parameter of the uplink signal includes at least one of the following: maximum sending power, target reception power, a path loss factor, a path loss estimation value, and a closed loop power adjustment factor.

In the above solution, the transmission parameter and/or the power control parameter of the uplink signal are respectively configured by the network device for each BWP among the multiple BWPs.

In an implementation of the present disclosure, for each BWP among the multiple BWPs, the transmission parameter and/or the power control parameter of the uplink signal on the BWP is a transmission parameter and/or a power control parameter of an uplink signal that is sent on the BWP at a moment when PH is calculated; or the transmission parameter and/or the power control parameter of the uplink signal on the BWP is a transmission parameter and/or a power control parameter of an uplink signal that is sent most recently on the BWP before PH is calculated.

According to different situations of transmitting the uplink signal, the implementation of the present disclosure calculates the PH by the following way:

1) If the terminal sends an uplink signal on a first BWP among the multiple BWPs at a moment when PH is calculated, calculating, by the terminal, the PH of the uplink signal on each BWP among the multiple BWPs according to the transmission parameter and/or the power control parameter of the uplink signal on the each BWP among the multiple BWPs includes: calculating, by the terminal, the PH of the uplink signal on the first BWP according to the transmission parameter and the power control parameter of the uplink signal on the first BWP.

2) If the terminal does not send an uplink signal on a first BWP among the multiple BWPs at a moment when PH is calculated, calculating, by the terminal, the PH of the uplink signal on each BWP among the multiple BWPs according to the transmission parameter and/or the power control parameter of the uplink signal on the each BWP among the multiple BWPs includes: calculating, by the terminal, the PH of the uplink signal on the first BWP according to the power control parameter of the uplink signal on the first BWP.

3) If a time interval between a moment when an uplink signal is sent most recently on a second BWP among the multiple BWPs before PH is calculated and a moment when the PH is calculated is less than a first duration, calculating, by the terminal, the PH of the uplink signal on each BWP among the multiple BWPs according to the transmission parameter and/or the power control parameter of the uplink signal on the each BWP among the multiple BWPs includes: calculating, by the terminal, the PH of the uplink signal on the second BWP according to the transmission parameter and the power control parameter of the uplink signal on the second BWP.

4) If a time interval between a moment when an uplink signal is sent most recently on a second BWP among the multiple BWPs before PH is calculated and a moment when the PH is calculated is greater than or equal to the first duration, calculating, by the terminal, the PH of the uplink signal on each BWP among the multiple BWPs according to the transmission parameter and/or the power control parameter of the uplink signal on the each BWP among the multiple BWPs includes: calculating, by the terminal, the PH of the uplink signal on the second BWP according to the power control parameter of the uplink signal on the second BWP.

Here, the first duration is a predefined interval, and in one example, the first duration may be several time slots.

In one implementation, the uplink signal is a signal on a PUSCH, an SRS, a signal on a PUCCH, or a signal on a PRACH.

In an implementation of the present disclosure, the PH calculated according to a transmission parameter and a power control parameter of an uplink signal is also referred to as real PH, and the PH calculated according to a power control parameter is also referred to as virtual PH. The description will be set forth in the following in combination with specific examples.

Example 1: A method for a terminal to calculate, based on a transmission parameter and a power control parameter of a PUSCH on a BWP k on a carrier C, real PH of the PUSCH on the BWP is as follows:

$$PH_{type1,f,c,k}(i,j,q_d,l) = P_{CMAX,f,c,k}(i) - \{P_{O\_PUSCH,f,c,k}(j) + 10\log_{10}(2^\mu \cdot M_{RB,f,c,k}^{PUSCH}(i)) + \alpha_{f,c,k}(j) \cdot PL_{f,c,k}(q_d) + \Delta_{TF,f,c,k} + f_{f,c,k}(i,l)\}$$

Parameters in the above formula are parameters configured or indicated for the PUSCH on the BWP k (i.e., parameters specific to each BWP), wherein $M_{RB,f,c,k}^{PUSCH}(i)$ represents transmission bandwidth of the PUSCH, $\Delta_{TF,f,c,k}(i)$ is obtained according to a modulation and coding scheme, $\mu$ is subcarrier spacing of the PUSCH transmission, $P_{CMAX,f,c,k}(i)$ is the maximum sending power of the terminal on the BWP, $P_{O\_PUSCH,f,c,k}(j)$ is target reception power of the PUSCH, $\alpha_{f,c,k}(j)$ is a path loss factor, $PL_{f,c,k}(q_d)$ is a path loss estimation value, and $f_{f,c,k}(i,l)$ is a closed loop power adjustment factor.

Example 2: A method for a terminal to calculate, based on a power control parameter of a PUSCH on a BWP k on a carrier C, virtual PH of the PUSCH on the BWP is as follows:

$$PH_{type1,f,c,k}(i,j,q_d,l) = \tilde{P}_{CMAX,f,c,k}(i) - \{P_{O\_PUSCH,f,c,k}(j) + \alpha_{f,c,k}(j) \cdot PL_{f,c,k}(q_d) + f_{f,c,k}(i,l)\}$$

Parameters in the above formula are power control parameters configured or indicated for the PUSCH on the BWP k (i.e., parameters specific to each BWP), wherein $\tilde{P}_{CMAX,f,c,k}(i)$ is the maximum sending power presumed by the terminal on the BWP, $P_{O\_PUSCH,f,c,k}(j)$ is target reception power of the PUSCH, $\alpha_{f,c,k}(j)$ is a path loss factor, $PL_{f,c,k}(q_d)$ is a path loss estimation value, and $f_{f,c,k}(i,l)$ is a closed loop power adjustment factor.

Example 3: A method for a terminal to calculate, based on a transmission parameter and a power control parameter of an SRS on a BWP k on a carrier C, real PH of the SRS on the BWP is as follows:

$$PH_{type3,f,c,k}(i,q_s,l) = P_{CMAX,f,c,k}(i) - \{P_{O\_SRS,f,c,k}(q_s) + 10\log_{10}(2^\mu \cdot M_{SRS,f,c,k}(i)) + \alpha_{SRS,f,c,k}(q_s) \cdot PL_{f,c,k}(q_s) + h_{f,c,k}(i,l)\}$$

Parameters in the above formula are parameters configured or indicated for the SRS on the BWP k (i.e., parameters specific to each BWP), wherein $M_{SRS,f,c,k}(i)$ represents transmission bandwidth of the SRS, $\mu$ is subcarrier spacing of the SRS transmission, $P_{CMAX,f,c,k}(i)$ is the maximum sending power of the terminal on the BWP, $P_{O\_SRS,f,c,k}(q_s)$ is target reception power, $\alpha_{SRS,f,c,k}(q_s)$ is a path loss factor, $PL_{f,c,k}(q_s)$ is a path loss estimation value, and $h_{f,c,k}(i,l)$ is a closed loop power adjustment factor for the SRS.

Example 4: A method for a terminal to calculate, based on a power control parameter of an SRS on a BWP k on a carrier C, virtual PH of the SRS on the BWP is as follows:

$$PH_{type3,f,c,k}(i,q_s,l) = \tilde{P}_{CMAX,f,c,k}(i) - \{P_{O\_SRS,f,c,k}(q_{s0}) + \alpha_{SRS,f,c,k}(q_{s0}) \cdot PL_{f,c,k}(q_{s0}) + h_{f,c,k}(i,l)\}$$

Parameters in the above formula are parameters configured or indicated for the SRS on the BWP k (i.e., parameters specific to each BV P), wherein $\tilde{P}_{CMAX,f,c,k}(i)$ is the maximum sending power presumed by the terminal on the BWP, $P_{O\_SRS,f,c,k}(q_{s0})$ is target reception power, $\alpha_{SRS,f,c,k}(q_{s0})$ is a path loss factor, $PL_{f,c,k}(q_{s0})$ is a path loss estimation value, and $h_{f,c,k}(i,l)$ is a closed loop power adjustment factor for the SRS.

Act 102: The terminal sends the PH of the uplink signal on at least one BWP among the multiple BWPs to a network device.

In one implementation, the terminal sends first PH of an uplink signal on a first BWP among the multiple BWPs and a difference value between the first PH and the PH of the uplink signal on the at least one BWP other than the first BWP among the multiple BWPs to the network device. Specifically, the terminal only reports an actual PH value of an uplink signal on one BWP and only reports differential PH values for uplink signals on other BWPs, thus saving the signaling overhead of the report. Herein, the BWP for which the actual PH value is reported may be a BWP with the lowest index among the multiple BWPs or a BWP with the highest priority among the multiple BWPs.

In one implementation, the terminal sends a BWP index of each BWP in the at least one BWP among the multiple BWPs and the PH corresponding to the BWP to the network device. Thereby, the network side can determine a BWP corresponding to each piece of PH according to the index.

In one implementation, the terminal sends the PH of the uplink signal on a BWP in an activated state among the multiple BWPs to the network device. Specifically, when the terminal reports PH at a particular moment, only one or several BWPs among the multiple BWPs are activated at that moment, and the terminal only reports the PH corresponding to the activated BWPs and does not report the PH corresponding to inactive BWPs. If only one BWP is activated at each moment, the network side can know the BWP corresponding to the reported PH according to the currently activated BWP.

In one implementation, the terminal sends the PH of the uplink signal on the at least one BWP corresponding to a maximum or minimum PH value among the multiple BWPs to the network device.

In one implementation, the multiple BWPs belong to a first carrier, and the method further includes: calculating, by the terminal, PH of an uplink signal on the first carrier based on the PH of the uplink signal on the at least one BWP among the multiple BWPs on the first carrier (the calculation method may be calculating the average, or sum, etc.); and sending, by the terminal, the PH of the uplink signal on the first carrier to the network device.

Herein, the terminal calculates the PH of the uplink signal on the first carrier based on the PH of the uplink signal on the at least one BWP among the multiple BWPs on the first carrier by one of the following two ways:

The first way: The terminal calculates the PH of the uplink signal on the first carrier based on PH of uplink signals on all the BWPs of the multiple BWPs on the first carrier.

For example, the network side configures four BWPs on one carrier of the terminal, and the terminal calculates PH of a PUSCH or an SRS on each BWP respectively, and obtains PH of the carrier after averaging linear values of PH of the four BWPs, and reports the PH of the carrier to the network side.

The second way: The terminal calculates the PH of the uplink signal on the first carrier based on PH of an uplink signal on a BWP in an activated state among the multiple BWPs on the first carrier.

For example, the network side configures four BWPs on one carrier of the terminal, but only two BWPs are activated at the moment when PH is reported, and the terminal obtains PH of the carrier after averaging linear values of PH of the two activated BWPs, and reports the PH of the carrier to the network side.

According, to a technical solution of an implementation of the present disclosure, a terminal can report PH respectively corresponding to multiple BWPs configured on one carrier, so that a network side can perform switching among the multiple BWPs flexibly and simultaneously determine resource allocation and an uplink power control parameter on each BWP.

Figure 2:
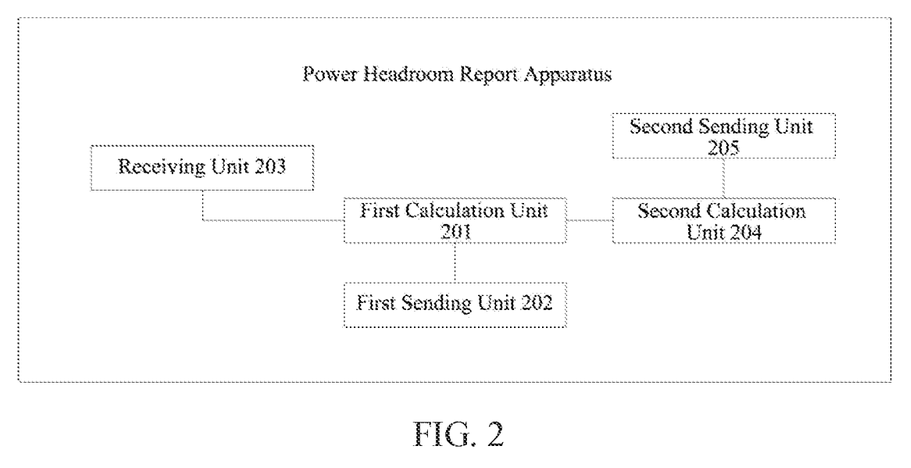
FIG. 2 is a schematic diagram of structural composition of a power headroom report apparatus according to an implementation of the present disclosure.

FIG. 2 is a schematic diagram of structural composition of a power headroom report apparatus according to an implementation of the present disclosure. As shown in FIG. 2, the power headroom report apparatus includes: a first calculation unit 201, configured to calculate power headroom (PH) of uplink signals on multiple BWPs, wherein the multiple BWPs are BWPs currently configured or activated for the terminal; and a first sending unit 202, configured to send the PH of the uplink signal on at least one BWP among the multiple BWPs to a network device.

In one implementation, the apparatus further includes: a receiving unit 203, configured to receive the multiple BWPs indicated by the network device through RRC signaling, SI, MAC signaling, or DCI signaling.

In one implementation, the multiple BWPs are BWPs configured or activated by the network device for the terminal on one carrier.

In one implementation, the first calculation unit 201 is configured to calculate PH of an uplink signal on each BWP among the multiple BWPs according to a transmission parameter and/or a power control parameter of the uplink signal on the each BWP among the multiple BWPs.

In one implementation, the transmission parameter of the uplink signal includes at least one of the following: transmission bandwidth of the uplink signal, a modulation and coding scheme of the uplink signal, and subcarrier spacing of the uplink signal.

In one implementation, the power control parameter of the uplink signal includes at least one of the following: maximum sending power, target reception power, a path loss factor, a path loss estimation value, and a closed loop power adjustment factor.

In one implementation, the transmission parameter and/or the power control parameter of the uplink signal are respectively configured by the network device for each BWP among the multiple BWPs.

In one implementation, for each BWP among the multiple BWPs: the transmission parameter and/or the power control parameter of the uplink signal on the BWP is a transmission parameter and/or a power control parameter of an uplink signal that is sent on the BWP at a moment when PH is calculated, or the transmission parameter and/or the power control parameter of the uplink signal on the BWP is a transmission parameter and/or a power control parameter of an uplink signal that is sent most recently on the BWP before PH is calculated.

In one implementation, if the terminal sends an uplink signal on a first BWP among the multiple BWPs at a moment when PH is calculated, the first calculation unit 201 is configured to calculate the PH of the uplink signal on the first BWP according to the transmission parameter and the power control parameter of the uplink signal on the first BWP.

In one implementation, if the terminal does not send an uplink signal on a first BWP among the multiple BWPs at a moment when PH is calculated, the first calculation unit 201 is configured to calculate the PH of the uplink signal on the first BWP according to the power control parameter of the uplink signal on the first BWP.

In one implementation, if a time interval between a moment when an uplink signal is sent most recently on a second BWP among the multiple BWPs before PH is calculated and a moment when the PH is calculated is less than a first duration, the first calculation unit 201 is configured to calculate the PH of the uplink signal on the second. BWP according to the transmission parameter and the power control parameter of the uplink signal on the second BWP.

In one implementation, if a time interval between a moment when an uplink signal is sent most recently on a second BWP among the multiple BWPs before PH is calculated and a moment when the PH is calculated is greater than or equal to the first duration, the first calculation unit 201 is configured to calculate the PH of the uplink signal on the second BWP according to the power control parameter of the uplink signal on the second BWP.

In one implementation, the first sending unit 202 is further configured to send a BWP index of each BWP in the at least one BWP among the multiple BWPs and the PH corresponding to the BWP to the network device.

In one implementation, the first sending unit 202 is configured to send the PH of the uplink signal on a BWP in an activated state among the multiple BWPs to the network device.

In one implementation, the first sending unit 202 is configured to send the PH of the uplink signal on the at least one BWP corresponding to a maximum or minimum PH value among the multiple BWPs to the network device.

In one implementation, the multiple BWPs belong to a first carrier, and the apparatus further includes: a second calculation unit 204, configured to calculate PH of an uplink signal on the first carrier based on the PH of the uplink signal on the at least one BWP among the multiple BWPs on the first carrier; and a second sending unit 205, configured to send the PH of the uplink signal on the first carrier to the network device.

In one implementation, the second calculation unit 204 is configured to calculate the PH of the uplink signal on the first carrier based on PH of uplink signals on all the BWPs of the multiple BWPs on the first carrier; or calculate the PH of the uplink signal on the first carrier based on PH of an uplink signal on a BWP in an activated state among the multiple BWPs on the first carrier.

In one implementation, the first sending unit 202 is configured to send first PH of an uplink signal on a first BWP among the multiple BWPs and a difference value between the first PH and the PH of the uplink signal on the at least one BWP other than the first BWP among the multiple BWPs to the network device.

In one implementation, the uplink signal is a signal on a PUSCH, an SRS, a signal on a PUCCH, or a signal on a PRACH.

Those skilled in the art should understand that the implementation functions of various units in the power headroom report apparatus shown in FIG. 2 can be understood with reference to the description related to the above power headroom report method. The functions of various units in the power headroom report apparatus shown in FIG. 2 can be realized by a program running on a processor or by a specific logic circuit.

The above power headroom report apparatus in the implementation of the present disclosure may be stored in a computer readable storage medium when it is implemented in the form of a software function module and sold or used as an independent product. Based on this understanding, the technical solutions in the implementations of the present disclosure, in essence, or the part contributing to the prior art, may be embodied in the form of a software product stored in a storage medium, including a number of instructions for causing a computer device (which may be a personal computer, a server, or a network device, etc.) to perform all or part of the methods described in various implementations of the present disclosure. The aforementioned storage medium includes a medium such as a U disk, a mobile hard disk, a read-only memory (ROM), a magnetic disk, or an optical disk, which is capable of storing program codes. Thus, the implementations of the present disclosure are not limited to any specific combination of hardware and software.

Correspondingly, an implementation of the present disclosure also provides a computer storage medium in which computer-executable instructions are stored, and when the computer-executable instructions are executed by a processor, the power headroom report method of the implementation of the present disclosure is implemented.

Figure 3:
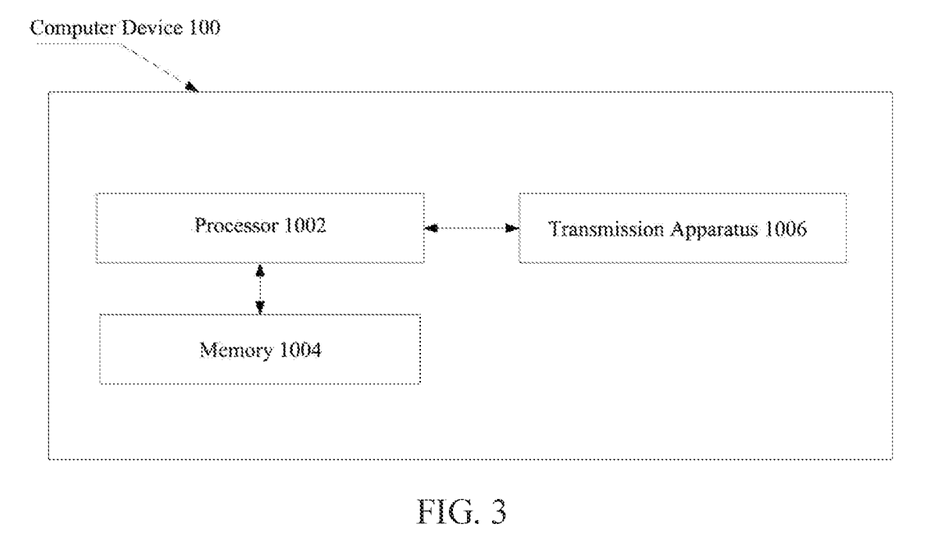
FIG. 3 is a schematic diagram of structural composition of a computer device according to an implementation of the present disclosure.

FIG. 3 is a schematic diagram of structural composition of a computer device according to an implementation of the present disclosure. The computer device may be any type of terminal. As shown in FIG. 3, a computer device 100 may include one processor 1002 or multiple processors (only one is shown in the figure), a memory 1004 for storing data, and a transmission apparatus 1006 for communication functions. The processor 1002 may include, but not limited to, a processing device such as a Micro Controller Unit (MCU), or a Field Programmable Gate Array (FPGA). One of ordinary skill in the art can understand that the structure shown in FIG. 3 is only schematic and does not limit the structure of the above electronic apparatus. For example, the computer device 100 may include more or fewer components than those shown in FIG. 3, or have a different configuration than that shown in FIG. 3.

The memory 1004 may be configured to store software programs and modules of application software, such as program instructions/modules corresponding to the method in the implementation of the present disclosure. The processor 1002 executes various functional applications and data processing, that is, implements the above method, by running the software programs and modules stored in the memory 1004. The memory 1004 may include a high-speed random access memory and may also include a non-volatile memory such as one or more magnetic storage apparatuses, flash memories, or other non-volatile solid-state memories. In some instances, the memory 1004 may further include a memory configured remotely from the processor 1002, and the remote memory may be connected to the computer device 100 through a network. Examples of the network include, but not limited to, the Internet, an intranet, a local area network, a mobile communication network, and combinations thereof.

The transmission apparatus 1006 is configured to receive or transmit data via a network. Specific examples of the network may include a wireless network provided by a communication supplier of the computer device 100. In one example, the transmission apparatus 1006 includes a Network Interface Controller (NIC), which can be connected to other network devices via a base station so as to communicate with the Internet. In one example, the transmission apparatus 1006 may be a Radio Frequency (RF) module configured to communicate with the Internet wirelessly.

The technical solutions described in the implementations of the present disclosure can be combined arbitrarily if there is no conflict.

In several implementations provided by the present disclosure, it should be understood that the disclosed methods and intelligent devices may be implemented in other ways. The device implementations described above are only illustrative, for example, the division of the units is only a logical function division, and there may be other division manners in actual implementation. For example, multiple units or components may be combined or integrated into another system, or some features may be ignored or not executed. In addition, the mutual coupling or direct coupling or communication connection between various components shown or discussed may be indirect coupling or communication connection through some interface, apparatus or unit, and may be electrical, mechanical or in other forms.

The units described as separate components may or may not be physically separated, and the components shown as units may or may not be physical units, i.e., they may be located in one place or may be distributed over multiple network units. Some or all of the units may be selected according to practical needs to achieve the purpose of the implementations.

In addition, various functional units in various implementations of the present disclosure may be integrated in a processing unit, or various units may be physically present separately, or two or more units may be integrated in one unit. The integrated units may be implemented in a form of hardware or in a form of hardware plus software functional units.

What are described above are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure.

What we claim is:

1. A method for receiving power headroom, comprising:
receiving, by a network device from a terminal, power headroom (PH) of an uplink signal in each bandwidth part (BWP) among a plurality of BWPs configured in one carrier after the terminal calculates PH of uplink signals in the plurality of BWPs according to a transmission parameter and/or a power control parameter of the uplink signal in each BWP among the plurality of BWPs, wherein the plurality of BWPs comprise at least two active uplink BWP for the terminal;
wherein for each BWP among the plurality of BWPs, the transmission parameter and/or the power control parameter of the uplink signal in the BWP is a transmission parameter and/or a power control parameter of the uplink signal that is sent in the BWP at a moment when the PH is calculated;

wherein when an uplink signal is sent by the terminal in a first BWP among the plurality of BWPs at the moment when the PH is calculated, the PH of the uplink signal in the first BWP is calculated by the terminal according to the transmission parameter and the power control parameter of the uplink signal in the first BWP.

2. The method of claim 1, wherein receiving, by the network device from the terminal, the PH of the uplink signal in at least one BWP among the plurality of BWPs comprises:

receiving, by the network device, the PH of the uplink signal in at least two active uplink BWPs sent simultaneously by the terminal.

3. The method of claim 1, wherein the transmission parameter of the uplink signal comprises at least one of the following: transmission bandwidth of the uplink signal, a modulation and coding scheme of the uplink signal, and subcarrier spacing of the uplink signal.

4. The method of claim 1, wherein the power control parameter of the uplink signal comprises at least one of the following: maximum sending power, target reception power, a path loss factor, a path loss estimation value, and a closed loop power adjustment factor.

5. The method of claim 1, further comprising:

configuring, by the network device, the transmission parameter and/or the power control parameter of the uplink signal respectively for each BWP among the plurality of BWPs.

6. The method of claim 1, wherein when the terminal does not send an uplink signal in a first BWP among the plurality of BWPs at a moment when PH is calculated, the terminal calculates the PH of the uplink signal in the first BWP according to the power control parameter of the uplink signal in the first BWP.

7. The method of claim 1, wherein the uplink signal is a signal in a physical uplink shared channel (PUSCH), or a sounding reference signal (SRS), or a signal in a physical uplink control channel (PUCCH), or a signal in a physical random access channel (PRACH).

8. A network device, comprising: a processor and a receiver, wherein, the processor is configured to control the receiver receive, from a terminal, power headroom (PH) of an uplink signal in each bandwidth part (BWP) among a plurality of BWPs configured in one carrier after the terminal calculates PH of uplink signals in the plurality of BWPs according to a transmission parameter and/or a power control parameter of the uplink signal in each BWP among the plurality of BWPs, wherein the plurality of BWPs comprise at least two active uplink BWP for the terminal;

wherein for each BWP among the plurality of BWPs, the transmission parameter and/or the power control parameter of the uplink signal in the BWP is a transmission parameter and/or a power control parameter of the uplink signal that is sent in the BWP at a moment when the PH is calculated;

wherein when an uplink signal is sent by the terminal in a first BWP among the plurality of BWPs at the moment when the PH is calculated, the PH of the uplink signal in the first BWP is calculated by the terminal according to the transmission parameter and the power control parameter of the uplink signal in the first BWP.

9. The apparatus of claim 8, wherein the receiver is configured to receive the PH of the uplink signal in at least two active uplink BWPs sent simultaneously by the terminal.

10. The apparatus of claim 8, wherein the transmission parameter of the uplink signal comprises at least one of the following: transmission bandwidth of the uplink signal, a modulation and coding scheme of the uplink signal, and subcarrier spacing of the uplink signal.

11. The apparatus of claim 8, wherein the power control parameter of the uplink signal comprises at least one of the following: maximum sending power, target reception power, a path loss factor, a path loss estimation value, and a closed loop power adjustment factor.

12. The apparatus of claim 8, the processor is further configured to:

configure the transmission parameter and/or the power control parameter of the uplink signal respectively for each BWP among the plurality of BWPs.

13. The apparatus of claim 8, wherein the uplink signal is a signal in a PUSCH, an SRS, a signal in a PUCCH, or a signal in a PRACH.

14. A non-transitory computer storage medium, comprising computer-executable instructions stored thereon, wherein when the computer-executable instructions are executed by a processor, the acts of claim 1 are implemented.

* * * * *